US008504846B2

(12) United States Patent
Nguyen et al.

(10) Patent No.: US 8,504,846 B2
(45) Date of Patent: Aug. 6, 2013

(54) METHOD AND APPARATUS FOR SECURE STORING OF PRIVATE DATA ON USER DEVICES IN TELECOMMUNICATIONS NETWORKS

(75) Inventors: Nhut Nguyen, Richardson, TX (US); Scott Fang, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1083 days.

(21) Appl. No.: 11/754,187

(22) Filed: May 25, 2007

(65) Prior Publication Data
US 2008/0294911 A1    Nov. 27, 2008

(51) Int. Cl.
*H04L 29/06* (2006.01)

(52) U.S. Cl.
USPC .............................. 713/193; 726/28; 713/165

(58) Field of Classification Search
USPC ................. 713/189–193, 165; 726/26, 28
See application file for complete search history.

(56) References Cited

U.S. PATENT DOCUMENTS

| | | | | |
|---|---|---|---|---|
| 5,689,565 A * | 11/1997 | Spies et al. | | 713/189 |
| 5,867,112 A * | 2/1999 | Kost | | 341/51 |
| 6,931,532 B1 * | 8/2005 | Davis et al. | | 713/167 |
| 7,093,129 B1 * | 8/2006 | Gavagni et al. | | 713/175 |
| 7,113,600 B1 * | 9/2006 | Rosenhed | | 380/272 |
| 7,293,289 B1 * | 11/2007 | Loc et al. | | 726/23 |
| 2001/0033661 A1 * | 10/2001 | Prokoski | | 380/258 |
| 2002/0138504 A1 * | 9/2002 | Yano et al. | | 707/204 |
| 2003/0172307 A1 * | 9/2003 | Henry et al. | | 713/201 |
| 2004/0083373 A1 * | 4/2004 | Perkins et al. | | 713/189 |
| 2006/0269053 A1 * | 11/2006 | Miyazawa | | 380/28 |
| 2007/0157308 A1 * | 7/2007 | Bardsley et al. | | 726/15 |

* cited by examiner

*Primary Examiner* — Beemnet Dada
*Assistant Examiner* — John B King (57) ABSTRACT

A system for securely storing data is provided. The system includes a transformation component operable to scramble or encrypt the data, a dissection component operable to divide the data into a plurality of segments, and a storage component operable to store the plurality of segments in a plurality of memory locations. These components can operate various schemes identified by encoded identifiers and new schemes can be added to the system at any time. A user device can use a combination of a transformation scheme, a dissection scheme, and a storage scheme to protect stored private data at any point in time. The combination can be changed quickly by the user device autonomously or upon receiving an instruction to do so.

20 Claims, 4 Drawing Sheets

METHOD AND APPARATUS FOR SECURE STORING OF PRIVATE DATA ON USER DEVICES IN TELECOMMUNICATIONS NETWORKS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Devices that might be used by users in a telecommunications network can include both mobile terminals, such as mobile telephones, personal digital assistants, handheld computers, and similar devices, and fixed terminals such as residential gateways. Such devices, which will be referred to herein as user devices, sometimes need to securely store private data. For example, the credentials a user device uses to gain access to network services typically need to be safeguarded against unauthorized use. Other examples of private data that might be stored on a user device include passwords, credit card numbers, contact information, device settings, encryption keys, and text-based data.

Currently, such private data might be stored on a subscriber identity module, or SIM card, that can be inserted into a user device. The use of a SIM card allows a user to easily transfer private data from an older user device to a newer user device upon the purchase of the newer device. SIM cards also allow a first user to use a user device belonging to a second user by simply inserting the first user's SIM card into the second user's device. Charges for a call can then be assigned to the first user even though the first user is using the second user's device.

While promoting the portability of data in this manner, SIM cards can also present some drawbacks. For example, the hardware-based SIM cards can increase the cost of a user device and can be cumbersome to provision, distribute, and modify. Also, data stored on a SIM card can be susceptible to theft since the card can be removed from a user device and read by another device or by a SIM card reader.

SUMMARY

In one embodiment, a system for securely storing data is provided. The system includes a transformation component operable to modify the data, a dissection component operable to divide the data into a plurality of segments, and a storage component operable to store the plurality of segments in a plurality of memory locations.

In another embodiment, a method for securely storing data is provided. The method includes transforming the data, wherein the transforming comprises at least one of encrypting the data and rearranging a sequence of data elements in the data. The method further includes dissecting the transformed data into a plurality of segments and storing the plurality of segments in a plurality of memory locations.

In another embodiment, a user device operable to securely store data is provided. The user device includes a transformation component configured to modify a form of the data, a dissection component configured to divide the data into a plurality of segments, a storage component configured to store the plurality of segments in a plurality of memory locations in a memory component in the user device, and a processor operable to promote the transformation component modifying the form of the data, the dissection component dividing the data, and the storage component storing the data.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and/or methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Embodiments of the present disclosure provide a system and method for secure storage of private data on a user device without the use of SIM cards or other hardware dedicated to securely storing private data. In an embodiment, a system with three components is installed on a user device and is used to securely store data. A first component, which can be referred to as a transformer, performs a transformation such as scrambling or encryption on the data. A second component, which can be referred to as a dissector, cuts the transformed data into segments. A third component, which can be referred to as a storer, stores the segments in different memory locations.

Each of the three components can employ one of a plurality of schemes for performing its function. That is, several different transformation schemes might be available to the transformer, several different dissection schemes might be available to the dissector, and several different storage schemes might be available to the storer. A network with which the system is in communication might specify which of the schemes are to be used for an instance of secure data storage. Alternatively, the schemes to be used for an instance of secure data storage might be based on internal characteristics of the user device on which the system is installed. For example, a particular set of schemes might be used on particular days or at particular times. The network may also be capable of pushing the implementation code sequences required to realize a scheme to the user device.

Figure 1:
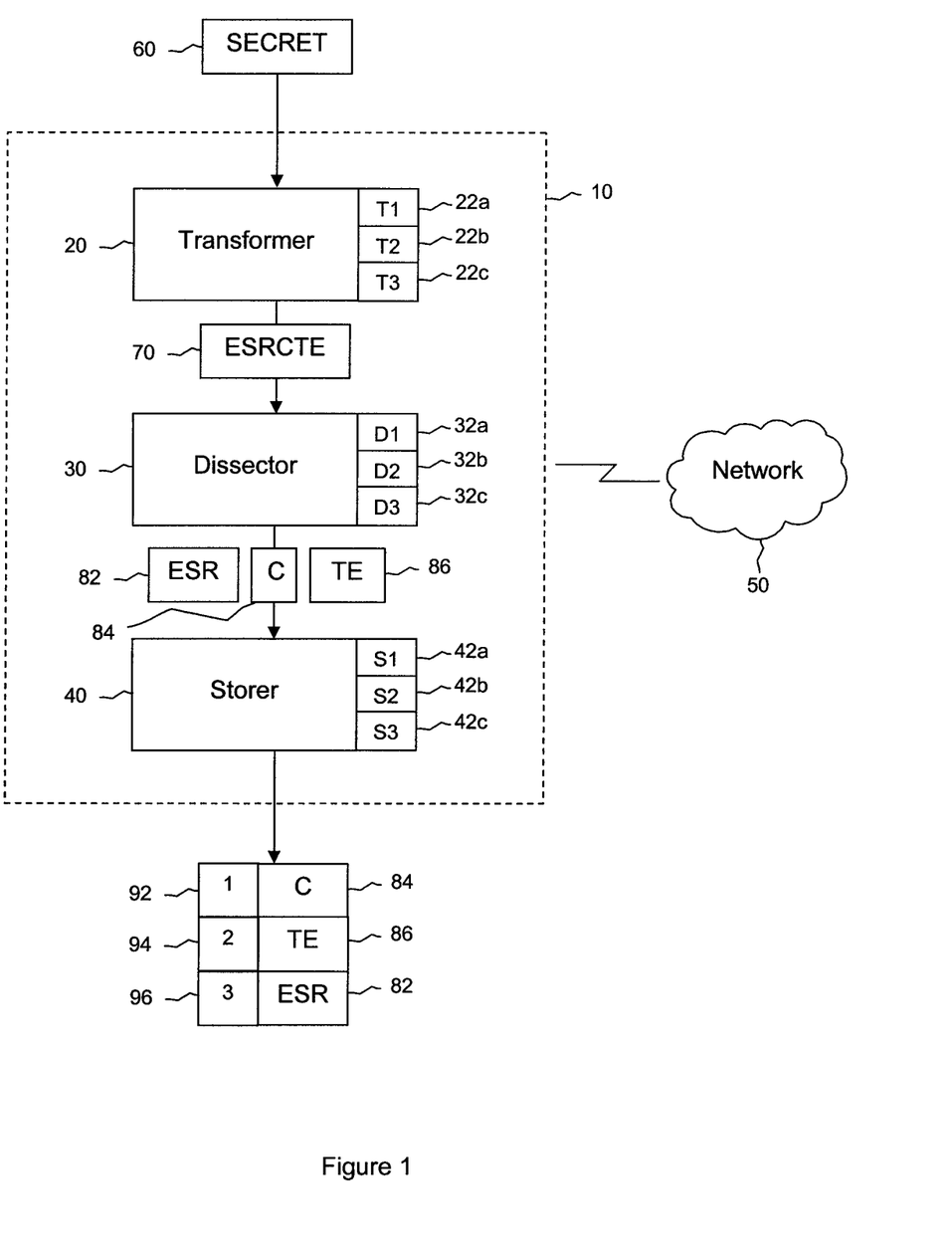
FIG. 1 is a diagram of a system for securely storing data according to an embodiment of the disclosure.

FIG. 1 illustrates an embodiment of a secure data storage system 10 that includes a transformer 20, a dissector 30, and a storer 40. A plurality of transformation schemes 22 are associated with the transformer 20, a plurality of dissection schemes 32 are associated with the dissector 30, and a plurality of storage schemes 42 are associated with the storer 40. While three of each of the schemes 22, 32, and 42 are shown in FIG. 1, in other embodiments other numbers of schemes could be present.

Each scheme 22, 32, and 42 causes a different type of transformation, dissection, and storage, respectively, to occur on a piece of private data. For example, transformation scheme T1 22a might be used to specify a first encryption routine, transformation scheme T2 22b might specify a second encryption routine, and transformation scheme T3 22c might specify a scrambling routine. Similarly, dissection scheme D1 32a might be a first technique for segmenting data, dissection scheme D2 32b might be a second technique for segmenting data, and dissection scheme D3 32c might be a third technique for segmenting data. Storage schemes S1 42a, S2 42b, and S3 42c might be different procedures for storing data. Also, any of the schemes 22, 32, or 42 might be null schemes. That is, one or more of the schemes 22, 32, or 42 might simply pass data on unchanged and perform no other action on the data.

The system 10 can communicate with a network 50, which might be a telecommunications network that provides telecommunications services to a user device on which the system 10 is installed. The network 50 might inform the system 10 which set of schemes 22, 32, and 42 are to be used when data is to be securely stored. For example, on one occasion, the network 50 might specify that transformation scheme T2 22b, dissection scheme D3 32c, and storage scheme S1 42a are to be used. On another occasion, another combination of schemes might be specified. The network 50 is also capable of generating the implementation code sequences for various schemes and sending them to the system 10 for storing in memory for future use.

In the example of FIG. 1, a piece of private data 60 consisting of the character string 'SECRET' is to be securely stored. The data 60 is passed to the transformer 20, where one of the transformation schemes 22 is applied to the data 60. The transformation scheme 22 that is to be applied might have been previously specified by the network 50. In this case, the transformation consists of simply reversing the sequence within each pair of characters in the string. That is, the 'SE' in SECRET becomes 'ES', the 'CR' becomes 'RC', and the 'ET' becomes 'TE', and thus the entire string of data 60 becomes the transformed string 70 'ESRCTE'. In another embodiment, a different transformation scheme 22 could have been applied to the data 60 and could have been as straightforward as this example or as complicated as a commercially available encryption algorithm.

The transformed string 70 is then passed to the dissector 30 and one of the dissection schemes 32 is applied to the transformed string 70. The dissection scheme 32 that is to be applied might have been previously specified by the network 50. In this case, the dissection consists of cutting the transformed string 70 into a first segment 82 of three characters, a second segment 84 of one character, and a third segment 86 of two characters. In another embodiment, the transformed string 70 could have been segmented in a different way according to a different one of the dissection schemes 32.

The segments 82, 84, and 86 are then passed to the storer 40 and one of the storage schemes 42 is applied to the segments 82, 84, and 86. Again, the network 50 might have previously specified which storage scheme 42 is to be applied. In this case, the first segment 82 is stored in a third memory location 96, the second segment 84 is stored in a first memory location 92, and the third segment 86 is stored in a second memory location 94. That is, the sequence of the segments 82, 84, and 86 as stored in increasingly higher numbered memory addresses is different from the sequence of the segments 82, 84, and 86 as generated by the dissector 30. In another embodiment, the segments 82, 84, and 86 could have been stored in a different way according to a different one of the storage schemes 42. The memory locations 92, 94, and 96 might be memory locations in a standard memory component in a user device in which the system 10 is installed.

When the original data 60 is passed through the system 10 in this manner, recreating the original data 60 from the transformed, segmented, and stored data becomes difficult for potential data thieves. A thief would need to know the storage scheme 42 that was used by the storer 40 in order to recreate the data that was passed into the storer 40, the dissection scheme 32 that was used by the dissector 30 in order to recreate the data that was passed into the dissector 30, and the transformation scheme 22 that was used by the transformer 20 in order to recreate the data that was passed into transformer 20. Discovering any one of these schemes 22, 32, or 42 might be difficult and discovering all three simultaneously would be even more so.

In an embodiment, the combination of a transformer scheme 22, a dissector scheme 32, and a storer scheme 42 used for securely storing data can be changed to further thwart potential data thieves. For example, if it is suspected that a thief has determined that schemes T2 22b, D1 32a, and S2 42b are currently in use and that the thief has identified the procedures used by those schemes, the network 50 might specify that the combination of schemes T3 22c, D3 32c, and S1 42a should be used. The thief would then need to crack each of the new schemes T3 22c, D3 32c, and S1 42a in order to recreate the original data 60 from the stored data.

Alternatively, rather than reactively changing the combination of schemes 22, 32, and 42 upon suspicion that that combination of schemes 22, 32, and 42 has been compromised, the network 50 might proactively instruct the system 10 to use new combinations of schemes 22, 32, and 42 on a periodic basis or on a random basis. In another alternative, the system 10 or a user device on which the system 10 is installed might include a component that causes the combination of schemes 22, 32, and 42 to be changed on a periodic basis or on a random basis. For example, an internal clock in the user device might be used to specify that the combination of schemes 22, 32, and 42 is to be changed on certain days or at certain times. The clock time could alternatively be used to seed a random number generator that causes the combination of schemes 22, 32, and 42 to be changed at random times. Any of these techniques for changing the combination of schemes 22, 32, and 42 could make the task of a potential data thief more difficult than would be the case if the same combination of schemes 22, 32, and 42 were used at all times.

To further decrease the likelihood that securely stored data can be comprised, one or more of the existing schemes 22, 32, and 42 can be modified and/or new schemes can be added. For example, if T1 22a represents a first encryption algorithm, T2 22b represents a second encryption algorithm, and T3 22c represents a third encryption algorithm, the network 50 may specify that, in the future, T1 22a should represent a fourth encryption algorithm, T2 22b should represent a fifth encryption algorithm, and T3 22c should represent a sixth encryption algorithm. Alternatively, the network 50 might add one or more transformation schemes to the existing transformation schemes T1 22a, T2 22b, and T3 22c. Similar considerations can apply to the dissection schemes 32 and the storage schemes 42. The modification of existing schemes and/or the addition of new schemes can further complicate the efforts of a potential thief attempting to identify the schemes in the system 10.

In an embodiment, different applications on a user device on which the system 10 is installed can use different combinations of schemes 22, 32, and 42. For example, a first combination of schemes 22, 32, and 42 (T3 22c, D2 32b, and S1 42a, for instance) might be used to securely store network access credentials and a second combination of schemes 22, 32, and 42 (T2 22b, D2 32b, and S2 42b, for instance) might be used to securely store text-based data. In this way, if a data thief gains access to data related to one application, access would not necessarily be gained to data related to other applications.

In an embodiment, the network 50 might send a combination of schemes 22, 32, and 42 to the system 10 in an encoded form. That is, instead of a scheme 22, 32, and/or 42 being specified by a title, such as T1, D1, or S1, a code might be used to specify each scheme 22, 32, and/or 42 singly or a combination of schemes 22, 32, and 42. A component in the system 10 or in a user device in which the system 10 is installed may be able to convert the code into the associated scheme 22, 32, and/or 42 or combination of schemes 22, 32, and 42. Without this encoding, a data thief who has previously discovered the encryption scheme specified by T1 22a, for instance, would thereafter know the encryption scheme being used when T1 22a is specified. With this encoding, even if the data thief knows the encryption scheme specified by T1 22a, the data thief would not necessarily know when T1 22a was being specified since the network 50 would make the specification in an encoded form.

In an embodiment, a processor on a user device on which the system 10 is installed can execute a routine that passes the original data 60 through the system 10. When the original data 60 is needed again, the processor can execute the routine in reverse to recreate the original data 60 from the transformed, segmented, and stored data. That is, the storage scheme 42 that was used by the storer 40 can be executed in reverse in order to recreate the data that was passed into the storer 40, the dissection scheme 32 that was used by the dissector 30 can be executed in reverse in order to recreate the data that was passed into the dissector 30, and the transformation scheme 22 that was used by the transformer 20 can be executed in reverse in order to recreate the original data 60 that was passed into transformer 20. In an embodiment, the routine that executes these reverse steps can be securely stored on the user device on which the system 10 is installed so that a data thief could not easily gain access to the routine and execute the routine to convert the transformed, segmented, and stored data into the original data 60.

Figure 2:
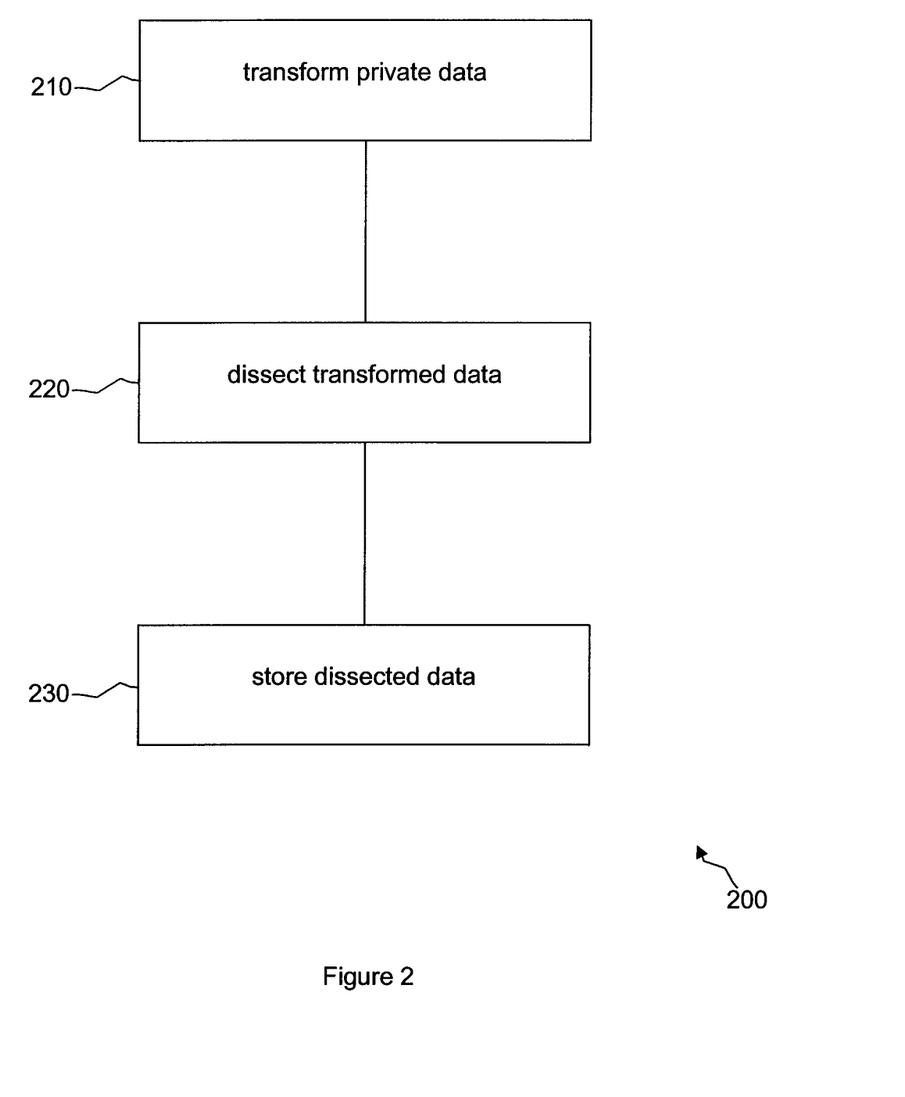
FIG. 2 is a diagram of a method for securely storing data according to an embodiment of the disclosure.

FIG. 2 illustrates an embodiment of a method 200 for securely storing data. At block 210, a piece of private data that is to be securely stored is transformed. The transformation might be an encryption of the data, a scrambling of the sequence of characters in the data, or some other procedure for obfuscating the data. At block 220, the transformed data is dissected. That is, the transformed data is divided into a plurality of segments. At block 230, the dissected data is stored in such a manner that the segments are placed in noncontiguous memory locations.

In an embodiment, the transformation is controlled by a transformation scheme, the dissection is controlled by a dissection scheme, and the storage is controlled by a storage scheme. The transformation scheme, the dissection scheme, and the storage scheme can each be identified by separate codes or a combination of a transformation scheme, a dissection scheme, and a storage scheme can be identified by a single code. The set of codes that specify the type of transformation, dissection, and storage that are to occur at a particular time can be changed autonomously by a user device on which the method 200 is performed or can be changed by a network with which the user device can communicate.

The above systems and methods can eliminate some of the drawbacks associated with storing secure data on SIM cards. For example, the difficulties in provisioning, distributing, and modifying SIM cards to allow the secure storage of data can be reduced. Also, the susceptibility of data to theft due to the easily removable nature of SIM cards is reduced. However, in some embodiments, use of the present systems and methods in conjunction with SIM cards is anticipated. In addition, the above systems and methods provide a great deal of flexibility in securely storing data since the schemes and combination of schemes can easily be changed as often as necessary to thwart potential data thieves.

While the above discussion has focused on systems and methods related to user devices in a telecommunications network, one of skill in the art will recognize that these systems and methods are not necessarily restricted to such devices. Other devices, such as desktop computers, that have a memory in which to store data and a processor to execute the transformation, dissection, and storage functions could use these or similar systems and methods to securely store data.

Figure 3:
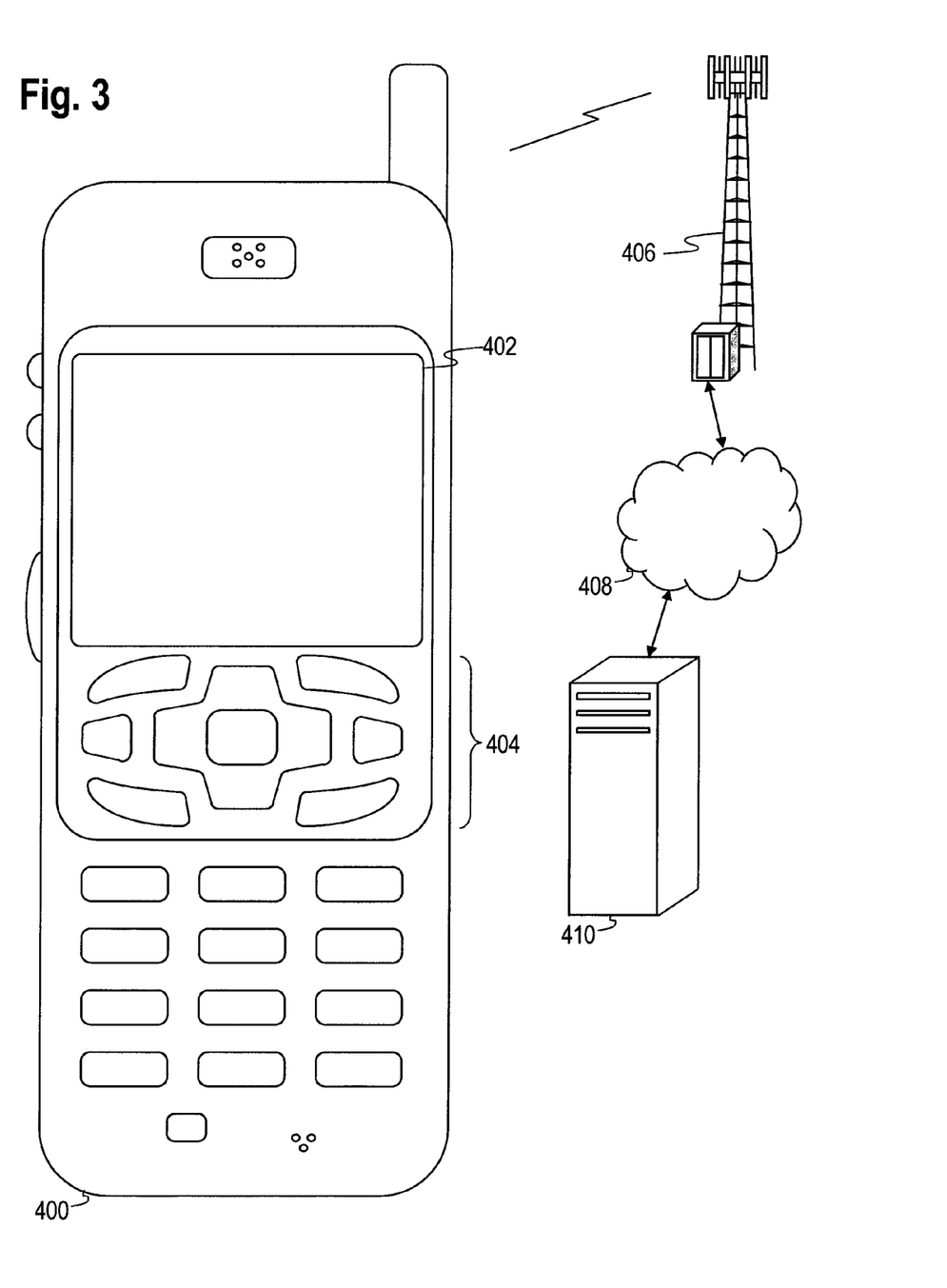
FIG. 3 is a diagram of a wireless communications system including a mobile device operable for some of the various embodiments of the disclosure as an illustrative example.

FIG. 3 shows a wireless communications system including a mobile device 400 that may be operable for implementing aspects of the present disclosure, but the present disclosure should not be limited to these implementations. Though illustrated as a mobile phone, the mobile device 400 may take various forms including a wireless handset, a pager, a personal digital assistant (PDA), a portable computer, a tablet computer, or a laptop computer. Many suitable mobile devices combine some or all of these functions. In some embodiments of the present disclosure, the mobile device 400 is not a general purpose computing device like a portable, laptop or tablet computer, but rather is a special-purpose communications device such as a mobile phone, wireless handset, pager, PDA, or residential gateway.

The mobile device 400 includes a display 402 and a touch-sensitive surface or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the mobile device 400. The mobile device 400 may further execute one or more software or firmware applications in response to user commands. These applications may configure the mobile device 400 to perform various customized functions in response to user interaction.

Among the various applications executable by the mobile device 400 are a web browser, which enables the display 402 to show a web page. The web page is obtained via wireless communications with a cell tower 406, a wireless network access node, or any other wireless communication network or system. This network or system may be substantially similar to the network 50 of FIG. 1. The cell tower 406 (or wireless network access node) is coupled to a wired network 408, such as the Internet. Via the wireless link and the wired network, the mobile device 400 has access to information on various servers, such as a server 410. The server 410 may provide content that may be shown on the display 402.

Figure 4:
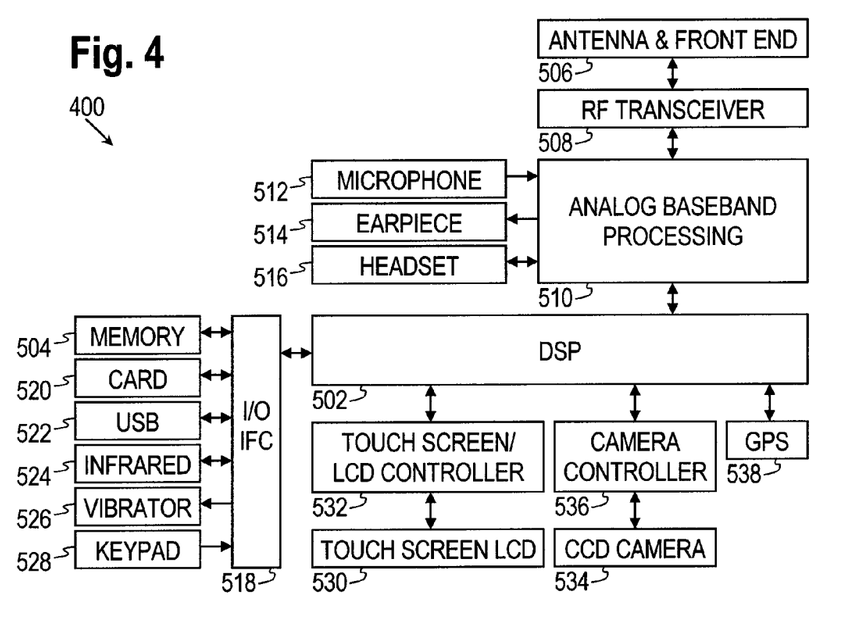
FIG. 4 is a block diagram of a mobile device operable for some of the various embodiments of the disclosure.

FIG. 4 shows a block diagram of the mobile device 400. The mobile device 400 includes a digital signal processor (DSP) 502 and a memory 504. As shown, the mobile device 400 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538.

The DSP 502 or some other form of controller or central processing unit operates to control the various components of the mobile device 400 in accordance with embedded software or firmware stored in memory 504. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 400 to send and receive information from a cellular network or some other available wireless communications network. The RF transceiver 508 provides frequency shifting, converting received RF signals to baseband and converting baseband transmit signals to RF. The analog baseband processing unit 510 may provide channel equalization and signal demodulation to extract information from received signals, may modulate information to create transmit signals, and may provide analog filtering for audio signals. To that end, the analog baseband processing unit 510 may have ports for connecting to the built-in microphone 512 and the earpiece speaker 514 that enable the mobile device 400 to be used as a cell phone. The analog baseband processing unit 510 may further include a port for connecting to a headset or other hands-free microphone and speaker configuration.

The DSP 502 may send and receive digital communications with a wireless network via the analog baseband processing unit 510. In some embodiments, these digital communications may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the infrared port 524. The USB interface 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The input/output interface 518 may further connect the DSP 502 to the vibrator 526 that, when triggered, causes the mobile device 400 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530.

The CCD camera 534 enables the mobile device 400 to take digital pictures. The DSP 502 communicates with the CCD camera 534 via the camera controller 536. The GPS sensor 538 is coupled to the DSP 502 to decode global positioning system signals, thereby enabling the mobile device 400 to determine its position. Various other peripherals may also be included to provide additional functions, e.g., radio and television reception.

Figure 5:
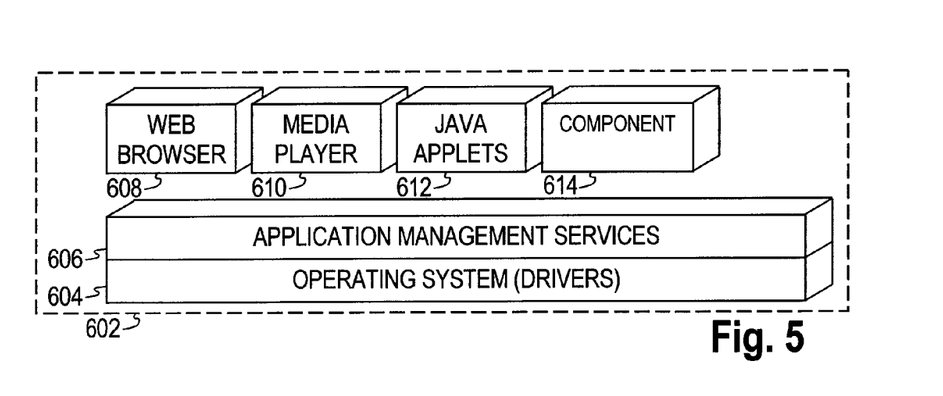
FIG. 5 is a diagram of a software environment that may be implemented on a mobile device operable for some of the various embodiments of the disclosure.

FIG. 5 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the mobile device 400. Also shown in FIG. 5 are a web browser application 608, a media player application 610, and Java applets 612. The web browser application 608 configures the mobile device 400 to operate as a web browser, allowing a user to enter information into forms and select links to retrieve and view web pages. The media player application 610 configures the mobile device 400 to retrieve and play audio or audiovisual media. The Java applets 612 configure the mobile device 400 to provide games, utilities, and other functionality. A component 614 might provide functionality related to secure storing of private data and may be substantially similar to the system 10 of FIG. 1.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system for securely storing data comprising:
   a transformation component configured to perform a modification of the data by one of a plurality of transformation schemes that includes at least one of encryption of the data and rearranging a sequence of data elements in the data;
   a dissection component configured to divide the data into a plurality of segments by one of a plurality of dissection schemes; and
   a storage component configured to store the plurality of segments in a plurality of memory locations in a user device by one of a plurality of storage schemes,
   wherein the system is installed on the user device,
   wherein a first combination of one of the plurality of transfollnation schemes, one of the plurality of dissection schemes, and one of the plurality of storage schemes to be used by the system is used to store text-based data and a second combination of the transformation, dissection, and storage schemes is used to store network access credentials,
   wherein the first and second combinations of schemes can be specified by both the user device and a telecommunications network in communication with the user device, and
   wherein the first and second combinations of schemes are changed periodically, the changed combinations being selected based on a current date and time.

2. The system of claim 1, wherein the telecommunications network specifies a change of the first and second combinations of schemes upon an occurrence of a suspicion that at least one of the schemes has been identified by an entity not authorized to access the data.

3. The system of claim 1, wherein the user device is configured to specify a change of the first and second combinations of schemes to be used by the system upon an occurrence of a suspicion that at least one of the schemes has been identified by an entity not authorized to access the data.

4. The system of claim 1, wherein the telecommunications network is configured to at least one of:
   modify an existing scheme; and
   add a new scheme to the system.

5. The system of claim 1, wherein the telecommunications network is configured to specify the first and second combinations of schemes by transmitting an encoded message to the user device.

6. The system of claim 5, wherein the first and second combinations of schemes transmitted in the encoded message is stored on the user device for future use by the user device.

7. The system of claim 1, wherein a routine on the user device is configured to promote the transformation component modifying the form of the data, the dissection component dividing the data, and the storage component storing the data, when the data is to be securely stored, and configured to promote the transformation component, the dissection component, and the storage component operating in a reverse manner when the data is to be retrieved, the routine being securely stored on the user device.

8. The system of claim 1, wherein the memory locations have a sequence of addresses from lowest to highest different from a sequence of the plurality of segments from first to last as generated by the dissection component.

9. The system of claim 1, wherein to change a combination of transformation, dissection, and storage schemes, the system receives from the telecommunications network a single code that indicates in an encoded form all three of the transformation, dissection, and storage schemes, and converts the single code into the associated combination of schemes.

10. A method for securely storing data, the method comprising:
    transforming the data by a user device by one of a plurality of transformation schemes, wherein the transforming comprises at least one of:
    encrypting the data, and
    rearranging a sequence of data elements in the data;
    dissecting the transformed data by the user device into a plurality of segments by one of a plurality of dissection schemes; and
    storing the plurality of segments in a plurality of memory locations in the user device according to one of a plurality of storage schemes,
    wherein a first combination of one of the plurality of transformation schemes, one of the plurality of dissection schemes, and one of the plurality of storage schemes to be used by the user device is used to store text-based data and a second combination of the transformation, dissection, and storage schemes is used to store network access credentials,
    wherein the first and second combinations of schemes can be specified by both the user device and a telecommunications network in communication with the user device, and
    wherein the first and second combinations of the schemes are changed periodically, the changed combinations being selected based on a current date and time.

11. The method of claim 10, further comprising specifying the first combination of schemes upon a first occasion and specifying the second combination of schemes upon a second occasion.

12. The method of claim 10, further comprising the telecommunications network performing at least one of:
    modifying an existing scheme;
    adding a new scheme; and
    specifying at least one of the first and second combinations of schemes by transmitting an encoded message to the user device.

13. The method of claim 10 further comprising:
    specifying by the telecommunications network a change of the first and second combinations of schemes upon an occurrence of a suspicion that at least one of the schemes has been identified by an entity not authorized to access the data.

14. The method of claim 10 further comprising:
    specifying by the user device a change of the first and second combinations of schemes upon an occurrence of a suspicion that at least one of the schemes has been identified by an entity not authorized to access the data.

15. The method of claim 12 further comprising:
    storing the first and second combinations of schemes transmitted in the encoded message on the user device for future use by the user device.

16. A user device operable to securely store data, the user device comprising:
    a transformation component configured to modify a form of the data according to one of a plurality of transformation schemes;
    a dissection component configured to divide the data into a plurality of segments according to one of a plurality of dissection schemes;
    a storage component configured to store the plurality of segments in a plurality of memory locations in a memory component in the user device according to one of a plurality of storage schemes; and a processor configured to promote the transformation component modifying the form of the data, the dissection component dividing the data, and the storage component storing the data, wherein a first combination of one of the plurality of transformation schemes, one of the plurality of dissection schemes, and one of the plurality of storage schemes to be used by the user device is used to store text-based data and a second combination of the transformation, dissection, and storage schemes is used to store network access credentials, wherein the first and second combinations of schemes can be specified by both the processor and a telecommunications network in communication with the user device, and wherein the first and second combinations of schemes are changed periodically, the changed combinations being selected based on a current date and time.

17. The user device of claim 16, wherein the memory locations have a sequence of addresses from lowest to highest different from a sequence of the plurality of segments from first to last as generated by the dissection component.

18. The user device of claim 16, wherein the specification of the first and second combinations of transformation, dissection, and storage schemes occurs upon an occurrence of a suspicion that at least one of the schemes has been identified by an entity not authorized to access the data.

19. The user device of claim 16, wherein the telecommunications network performs at least one of:
    modifying an existing scheme;
    adding a new scheme; and
    specifying at least one of the first and second combinations of schemes by transmitting an encoded message to the user device.

20. The user device of claim 16, to change a combination of transformation, dissection, and storage schemes, the user device receives from the telecommunications network a single code that indicates in an encoded form all three of the transformation, dissection, and storage schemes, and converts the single code into the associated combination of schemes.

* * * * *